United States Patent
Otosaka

(10) Patent No.: US 9,624,122 B2
(45) Date of Patent: Apr. 18, 2017

(54) GLASS BASE MATERIAL HANGING MECHANISM

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Gunma (JP)

( * ) Notice: Subject to any disclaimer, the term of this patent is extended or adjusted under 35 U.S.C. 154(b) by 564 days.

(21) Appl. No.: 14/042,738

(22) Filed: Oct. 1, 2013

(65) Prior Publication Data

US 2014/0097567 A1 Apr. 10, 2014

(30) Foreign Application Priority Data

Oct. 5, 2012 (JP) ................................. 2012-223180

(51) Int. Cl.
*C03B 37/14* (2006.01)
*C03B 37/014* (2006.01)
*C03B 37/012* (2006.01)
*C03B 37/027* (2006.01)

(52) U.S. Cl.
CPC .... *C03B 37/01486* (2013.01); *C03B 37/0126* (2013.01); *C03B 37/02736* (2013.01); *Y10T 29/49998* (2015.01)

(58) Field of Classification Search
CPC .......... C03B 37/01486; C03B 37/0126; C03B 37/02736; C03B 37/01884
USPC ......................................................... 65/323
See application file for complete search history.

(56) References Cited

U.S. PATENT DOCUMENTS

| 5,417,399 A * | 5/1995 | Saito ................. C03B 37/01486 248/317 |
| 2002/0014094 A1* | 2/2002 | Mikami ............ C03B 37/01486 65/500 |
| 2002/0020193 A1* | 2/2002 | Shimada ........... C03B 37/01228 65/377 |
| 2004/0159125 A1* | 8/2004 | Yagi .................... C03B 19/1484 65/477 |
| 2011/0214271 A1* | 9/2011 | Nunome ........... C03B 37/01486 29/426.1 |
| 2013/0333421 A1* | 12/2013 | Hamaguchi ......... C03B 37/0216 65/377 |

FOREIGN PATENT DOCUMENTS

| JP | H03-012336 A | 1/1991 |
| JP | 2007-210813 A | 8/2007 |
| JP | 4018247 B | 12/2007 |
| JP | 4309550 B | 8/2009 |

OTHER PUBLICATIONS

Office Action issued for counterpart Japanese Application 2012-223180, issued by Japan Patent Office on Sep. 30, 2015.

* cited by examiner

*Primary Examiner* — Larry E Waggle, Jr.
*Assistant Examiner* — Henry Hong

(57) ABSTRACT

Provided is a glass base material hanging mechanism that, when hanging a starting member or a glass base material, can tightly (solidly) connect the hanging shaft tube and the hanging component and can vertically align the hanging component and the center of the glass base material.

10 Claims, 6 Drawing Sheets

GLASS BASE MATERIAL HANGING MECHANISM

The contents of the following Japanese patent application are incorporated herein by reference:

No. 2012-223180 filed on Oct. 5, 2012.

BACKGROUND

1. Technical Field

The present invention relates to an optical fiber glass base material manufacturing apparatus or optical fiber drawing apparatus, particularly to a glass base material hanging mechanism that can be used to obtain a product with high precision and low curvature, eccentricity, and non-circularity.

2. Related Art

Optical fiber includes a core, which is a central portion with a high refractive index through which light passes, and a cladding, which has a low refractive index and surrounds the core. Quartz glass is the main material used in modern optical fiber to be used for optical communication, and this optical fiber usually has a core diameter of approximately 9 μm and a cladding diameter of approximately 125 μm.

The important characteristics desired for a communication optical fiber are low non-circularity for the cladding and low eccentricity for the core center relative to the cladding center (referred to hereinafter simply as "eccentricity"), for example. If the non-circularity and eccentricity are high, the cores of optical fibers are skewed from each other when the optical fibers are connected, and this results in high connection loss.

The optical fiber is manufactured by heating and elongating a cylindrical glass rod, known as optical fiber glass base material (referred to hereinafter simply as "glass base material"), from the bottom of the glass base material, and the non-circularity and eccentricity of this glass base material serving as the raw material are important for the resulting optical characteristics. Furthermore, if the glass base material is bent or skewed from a vertical orientation when being placed in the optical fiber manufacturing apparatus, the eccentricity and non-circularity of the resulting optical fiber will be even larger than the eccentricity and non-circularity of the glass base material serving as the raw material.

The optical fiber glass base material is manufactured through a process including a deposition step in which VAD or OVD is used to manufacture a porous glass base material, a sintering step in which the porous glass base material is sintered, and an elongation step in which the large glass base material obtained from the previous step is heated and elongated to be a size suitable for use as an optical fiber. This process is usually performed with the glass base material hanging vertically. For example, when VAD is performed, soot is deposited on the tip of a starting member that is hung vertically to manufacture the porous glass base material. Furthermore, when vertical OVD is performed, soot is deposited on the side surfaces of a starting member that is hung vertically to manufacture the porous glass base material. When the sintering is performed, the porous glass base material obtained from the VAD or OVD is hung vertically and undergoes transparent vitrification in a heating furnace. When the elongating is performed, the glass base material is hung vertically and heated.

In order to reduce the eccentricity and non-circularity, it is extremely important to hang the glass base material and starting member with a precisely vertical orientation. For example, when the porous glass base material undergoes transparent vitrification during the sintering, if the vertical orientation of the porous glass base material cannot be ensured, one side of the glass base material ends up nearer the heating furnace, and the temperature of this portion is higher than the temperature of other portions in the circumferential direction. This portion with a higher temperature experiences greater progression of the transparent vitrification, and this results in uneven contraction of the porous glass in the circumferential direction, thereby causing bending, eccentricity, and non-circularity.

Furthermore, if the glass base material is skewed from the vertical orientation during the elongation step, the heating state in the circumferential direction is uneven, and therefore bending and non-circularity occur when the pulling force for elongation is applied. Yet further, if the glass base material is skewed from the vertical orientation during the drawing step, the flow of gas in the furnace becomes asymmetrical, and this results in eccentricity and non-circularity of the fiber as well as bending known as "fiber curl" and diameter fluctuation in the optical fiber.

For the reasons shown above, it is extremely important that the glass base material and starting base material be hung vertically in each apparatus. Furthermore, if the connection portions between the glass base material or starting base material and the apparatus are not securely connected, the glass base material could be easily skewed from the vertical orientation by rotational force or pulling force, which results in the same effects as when the glass base material is skewed from the vertical position from the beginning.

A conventional glass base material hanging mechanism includes a wedge-shaped notch on a side surface of a hanging component (glass base material handle portion) and uses a hanging pin to align and connect a horizontal hole formed in a hanging shaft tube with the notch of the hanging component, such as shown in Patent Documents 1 and 2, for example. Furthermore, as shown in Patent Document 3, there is a glass base material hanging mechanism that includes a horizontal hole passing through the central axis of a hanging component and uses a hanging pin to align and connect a horizontal hole formed in a hanging shaft tube with the horizontal hole formed in the hanging component.

PRIOR ART DOCUMENTS

Patent Document 1: Japanese Patent Application Publication No. H03-012336
Patent Document 2: Japanese Patent No. 4,309,550
Patent Document 3: Japanese Patent No. 4,018,247

FIG. 5 is used to describe the problems with the method of including a wedge-shaped notch on a side surface of a hanging component and using a hanging pin to align and connect a horizontal hole formed in a hanging shaft tube with the notch, such as shown in Patent Documents 1 and 2.

By inserting the hanging pin 5 into the wedge-shaped notch 2 formed on the side surface of the hanging member 1 in order to align this notch with the horizontal hole 4 formed in the side surface of the hanging shaft tube 3, the hanging component 1 is connected to the hanging shaft tube 3, and the weight of the glass base material causes the surface of the hanging member 1 opposite the notch 2 to be securely and tightly connected to the inner surface of the hanging shaft tube 3.

With this method, the position of the hanging pin 5 is skewed horizontally from the center of mass 6 of the glass base material, and therefore a force F caused by the center of mass 6 of the glass base material attempting to move directly under the hanging pin 5 is experienced, and so the center of mass 6 attempts to move directly below the hanging pin 5. In actuality, due to the fact that rotation is regulated at the connection point 7 between the top end of the hanging component 1 and the inner surface of the hanging shaft tube and that there is bending of various components such as the hanging shaft and the glass base material, the center of mass 6 falls between the center of the hanging component 1 and the hanging pin 5, such that the central axis of the glass base material becomes inclined at an angle from the vertical orientation.

FIG. 6 is used to describe the problems with the method of connecting the hanging component and the hanging shaft tube, such as described in Patent Document 3.

The hanging pin 5 is inserted into the horizontal hole 8 formed to pass through the central axis of the hanging component 1 to align the horizontal hole 8 with the horizontal hole 4 formed in the hanging shaft tube 3 and connect the hanging component 1 to the hanging shaft tube 3. The horizontal hole 8 is formed in the hanging component 1 with a taper such that the central portion becomes narrower.

With this method, the center of mass 6 of the glass base material and the support point 9 are aligned vertically, and therefore the glass base material does not tilt. However, there is a gap 10 between the hanging component 1 and the hanging shaft tube 3 across the entire circumference of the hanging component 1, and since there is no force acting to tightly connect the hanging shaft tube 3 and the hanging component 1, the glass base material will become tilted from just a small amount of force. In particular, since the glass base material is rotated during the deposition and sintering steps, centrifugal force occurs if there is even a tiny skew between the rotational center and the center of mass of the glass base material, which causes the glass base material to tilt. Furthermore, since a pulling force is used during the elongation step, even a small temperature difference in the circumferential direction of softened portions creates a force in the horizontal direction, which causes the glass base material to tilt.

The conventional methods described above are incapable of both tightly connecting the hanging shaft tube and the hanging component and vertically aligning the hanging component and the center of the glass base material.

Therefore, it is an objective of the present invention to provide a glass base material hanging mechanism that, when hanging a starting member or a glass base material, can tightly (solidly) connect the hanging shaft tube and the hanging component and can vertically align the hanging component and the center of the glass base material.

SUMMARY

According to one aspect of the present invention, provided is a glass base material hanging mechanism that is used in an optical fiber glass base material manufacturing apparatus or an optical fiber drawing apparatus. The glass base material hanging mechanism comprises a hanging shaft tube that is for hanging a starting member or glass base material and that has a horizontal hole formed in a side portion thereof passing through a central axis thereof; and a hanging component that is positioned above the starting member or glass base material and that has a horizontal hole with an inclined flat surface. The flat surface is formed in a top surface of the horizontal hole in a manner to be inclined relative to a horizontal plane in a cross-sectional plane orthogonal to a direction in which the horizontal hole extends, the hanging component is inserted into the hanging shaft tube, and both of the horizontal holes are aligned and a hanging pin is inserted through the horizontal holes to connect the hanging shaft tube and the hanging component.

DESCRIPTION OF EXEMPLARY EMBODIMENTS

Figure 1:
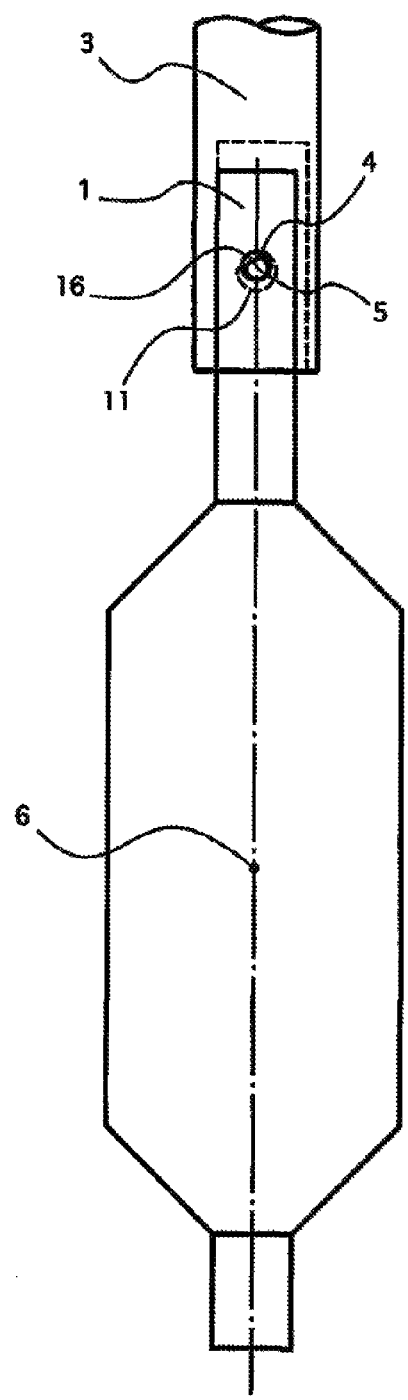
FIG. 1 is a schematic vertical cross-sectional view of the glass base material hanging mechanism of the present invention.

Hereinafter, an embodiment of the present invention will be described, but the embodiment does not limit the invention.

A glass base material hanging mechanism includes a hanging shaft tube that is for hanging a starting member or glass base material and that has a horizontal hole formed in a side portion thereof passing through a central axis thereof, and a hanging component that is positioned above the starting member or glass base material, the hanging component having a horizontal hole with an inclined flat surface. The flat surface is formed in a top surface of the horizontal hole in a manner to be inclined relative to a horizontal plane in a cross-sectional plane orthogonal to a direction in which the horizontal hole extends, the hanging component is inserted into the hanging shaft tube, and both horizontal holes are aligned and a hanging pin is inserted through the horizontal holes to connect the hanging shaft tube and the hanging component.

In this way, the flat surface formed within the horizontal hole of the hanging component is formed in the top surface of the horizontal hole in a manner to be inclined relative to a horizontal plane in a cross-sectional plane orthogonal to the direction in which the horizontal hole extends. As a result, when the hanging pin is inserted, the load placed on the hanging pin causes the hanging component to be pressed along the inner surface of the hanging shaft tube. Therefore, the vertical line passing through the center of mass of the glass base material passes through the center of the hanging pin, and so the hanging shaft tube and the hanging component can be tightly connected without tilting the glass base material.

The hanging pin is a cylindrical pillar having a flat surface formed by removing a portion of a side surface thereof, and the flat surface of the hanging pin contacts the flat surface of the horizontal hole of the hanging component. In this way, the contact between the hanging pin and the hanging component changes from linear contact to surface contact, thereby reducing stress and preventing damage to the contacting portions. Furthermore, the inclined surface of the horizontal hole of the hanging component is preferably formed to span the center line of the hanging component. In this way, the surface area of the contact surface with the flat surface of the hanging pin can be increased, thereby reducing the pressure on the flat surface. As a result, small cuts that cause damage in the flat surface of the hanging pin and the hanging component are less likely to occur.

The hanging component includes a circular hole in the side surface thereof, and the round hole preferably has therein a flat surface forming member that is a cylindrical pillar from which a portion of the side surface is removed to form a flat surface. The hanging component is made of the same quartz glass as the glass base material, and therefore complex machining of the hanging component requires significant effort and cost. By using this method, only the simple processes of machining the round hole in the side surface of the quartz glass rod and removing the portion to form the flat surface forming member from the quartz glass rod are necessary, and therefore the cost and effort can be decreased.

The angle $\theta$ between the horizontal plane and the inclined flat surface formed in the horizontal hole of the hanging component is set within a prescribed range. The threshold values for the range of $\theta$ are set in consideration of two features, which are the pressing force exerted on the inner surface of the hanging shaft tube by the hanging component and the prevention of "shrinkage fitting."

If the force of friction is ignored, the pressing force exerted on the inner surface of the hanging shaft tube by the hanging component is expressed as $W \cdot \sin \theta \cdot \cos \theta$, with W representing the weight of the glass base material. When $\theta$ is less than 20 degrees or more than 70 degrees, the pressing force is weak, and a gap occurs between the inner wall of the hanging shaft tube and the inner surface of the hanging component. Accordingly, in order to achieve sufficient pressing force, $\theta$ is preferably set to always be no less than 20 degrees and no greater than 70 degrees.

On the other hand, when $\theta$ is greater than 60 degrees, the heating and cooling cycle causes the hanging shaft tube, hanging component, or hanging pin to be damaged or causes the hanging pin to become stuck to the hanging shaft tube and hanging component. This phenomenon is referred to as "shrinkage fitting." Shrinkage fitting occurs when the thermal expansion coefficient of the hanging shaft tube is greater than the thermal expansion coefficient of the hanging component. The hanging shaft tube that expands further due to the high temperature contracts when cooled, and presses on the hanging component positioned therein. This force is represented as F. This force causes the hanging component to press up on the inclined surface of the hanging pin, and the magnitude of this force is $F \cdot \cos \theta$. In contrast to this force, a gravitational force of $W \cdot \sin \theta$ presses down on the inclined surface. Accordingly, the difference between these forces ($F \cdot \cos \theta - W \cdot \sin \theta$) is the magnitude of the force pressing up on the inclined surface. Accordingly, if $F \cdot \cos \theta - W \cdot \sin \theta$ is greater than 0, the hanging component is pressed by the contracting hanging shaft tube during cooling and moves within the hanging shaft tube, and therefore shrinkage fitting does not occur. Here, the magnitude of F is the result of natural forces and cannot be changed by people, and therefore an actual performance evaluation is difficult. Accordingly, values of $\theta$ that fulfill the above mathematical expression were sought experimentally. As a result, it was found that $\theta$ is preferably kept at 60 degrees or less.

Based on the above, the range of $\theta$ is preferably no less than 20 degrees and no greater than 70 degrees when considering the pressing force exerted on the inner surface of the hanging shaft tube by the hanging component and no greater than 60 degrees when considering prevention of shrinkage fitting, and therefore $\theta$ is preferably no less than 20 degrees and no greater than 60 degrees when considering both of these characteristics.

The ideal value for $\theta$ differs depending on the weight of the glass base material, the diameter of the hanging component, the material of the hanging shaft tube, and the like, but if the weight of the glass base material is from 80 kg to 150 kg, the diameter of the hanging component is 40 mm, and silicon nitride ceramic is used for the hanging shaft tube and the hanging pin, for example, then shrinkage fitting can be avoided and suitable pressing can be achieved by setting $\theta$ to be no less than 20 degrees and no more than 60 degrees.

By sandwiching a shock absorbent material between contacting portions of the flat surfaces of the hanging pin and the horizontal hole of the hanging component, the occurrence of shrinkage fitting can be further reduced. The shock absorbent material should act as a heat resistant cushion, and suitable materials include an expandable graphite sheet, a C/C composite sheet, or a Teflon sheet (registered trademark), for example. In particular, due to the sintering, elongating, and drawing steps that use high temperatures, high temperature resistance and high staining resistance are desired characteristics, and therefore an expandable graphite sheet or a C/C composite sheet that has been highly purified can be used as needed.

If the hanging component is tilted when the hanging shaft tube and the hanging component are combined, in order to align the center of the hanging component with the center of the hanging shaft tube, the center of the vertical hole of the hanging shaft tube, i.e. the insertion hole for the hanging component, can be offset from the outer diameter center of the hanging shaft tube in a direction opposite the lower side of the flat surface of the horizontal hole of the hanging component.

Examples of apparatuses that can serve as the glass base material manufacturing apparatus of the present embodiment include a porous glass base material deposition apparatus, a porous glass base material sintering apparatus, a glass base material elongating apparatus, and an optical fiber drawing apparatus.

The glass base material hanging apparatus of the present embodiment is described in further detail using FIGS. 1 to 4.

Figure 2:
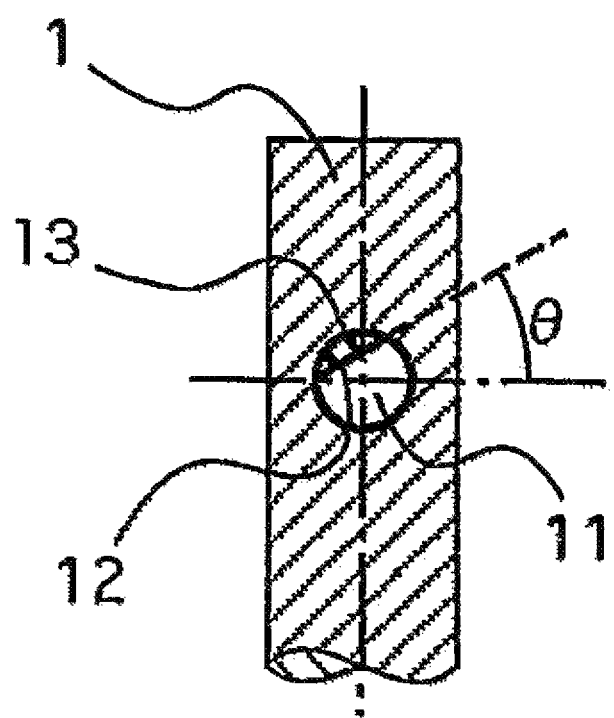
FIG. 2 is a schematic view of an exemplary hanging component according to the present invention.

FIG. 1 is a schematic view of an exemplary configuration of the glass base material hanging apparatus according to the present embodiment. FIG. 2 shows an exemplary glass base material hanging component according to the present embodiment.

The horizontal hole 11 is formed in the hanging component 1, and the flat surface 12 is formed in the top surface of the horizontal hole 11 to be inclined at an angle $\theta$ from the horizontal plane within a cross-sectional plane that is orthogonal to the direction in which the horizontal hole 11 extends. In particular, in the present embodiment, the flat surface 12 is inclined at an angle $\theta$ from the horizontal plane within each cross-sectional plane orthogonal to the direction in which the horizontal hole 11 extends. In the present embodiment, the angle $\theta$ is 30 degrees. The flat surface 12 can be formed by connecting the flat surface forming member 13 to the top surface of the circular horizontal hole 11, and the means for connecting the flat surface forming member 13 can be selected from among a heat resistant ceramic adhesive, an epoxy adhesive, and double-sided tape, for example, depending on the temperature to be used and the desired staining resistance.

Figure 3:
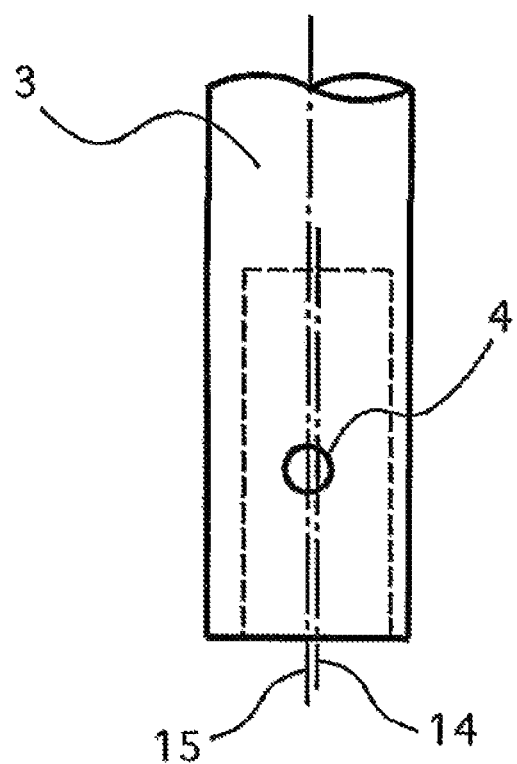
FIG. 3 is a schematic view of an exemplary hanging shaft tube according to the present invention.

FIG. 3 shows an exemplary hanging shaft tube of the present embodiment, and the horizontal hole 4 formed in the hanging shaft tube 3.

In order to align the center of the hanging component 1 with the center of hanging shaft tube 3 when combining the hanging shaft tube 3 and the hanging component 1, the vertical hole center 14 of the hanging shaft tube 3 may be offset from the outer diameter center 15 of the hanging shaft tube 3 in a direction opposite the lower side of the flat surface 12 in the horizontal hole 11 of the hanging component 1.

Figure 4:
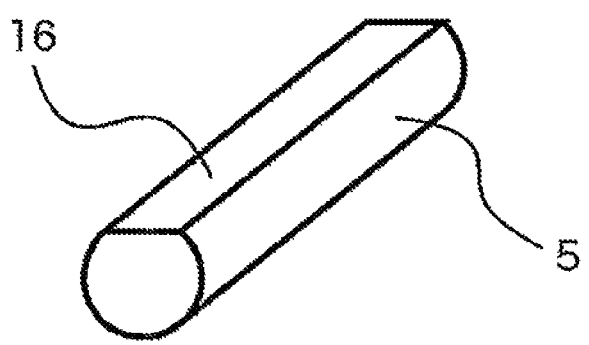
FIG. 4 is a schematic view of an exemplary hanging pin according to the present invention.
Figure 5:
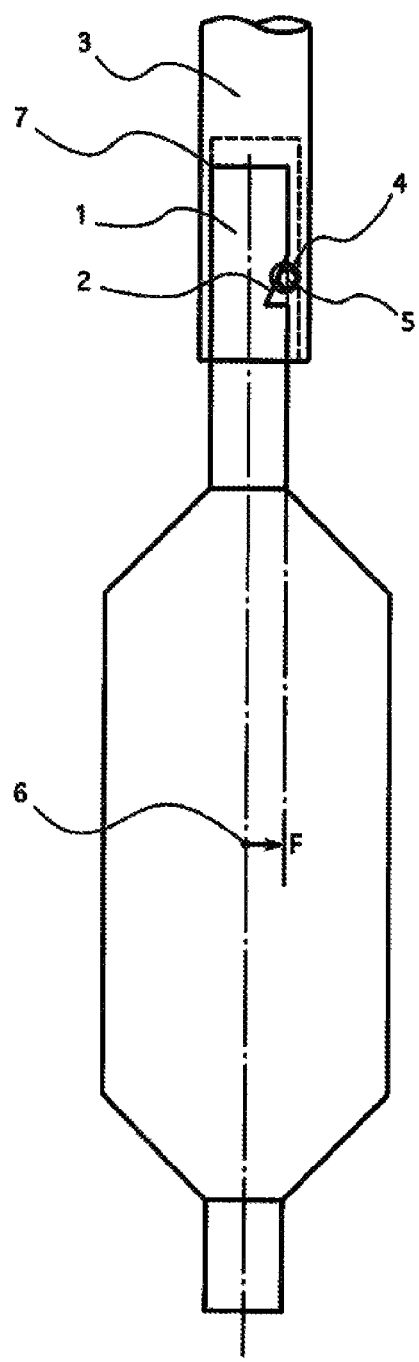
FIG. 5 is a schematic vertical cross-sectional view of a conventional glass base material hanging mechanism.
Figure 6:
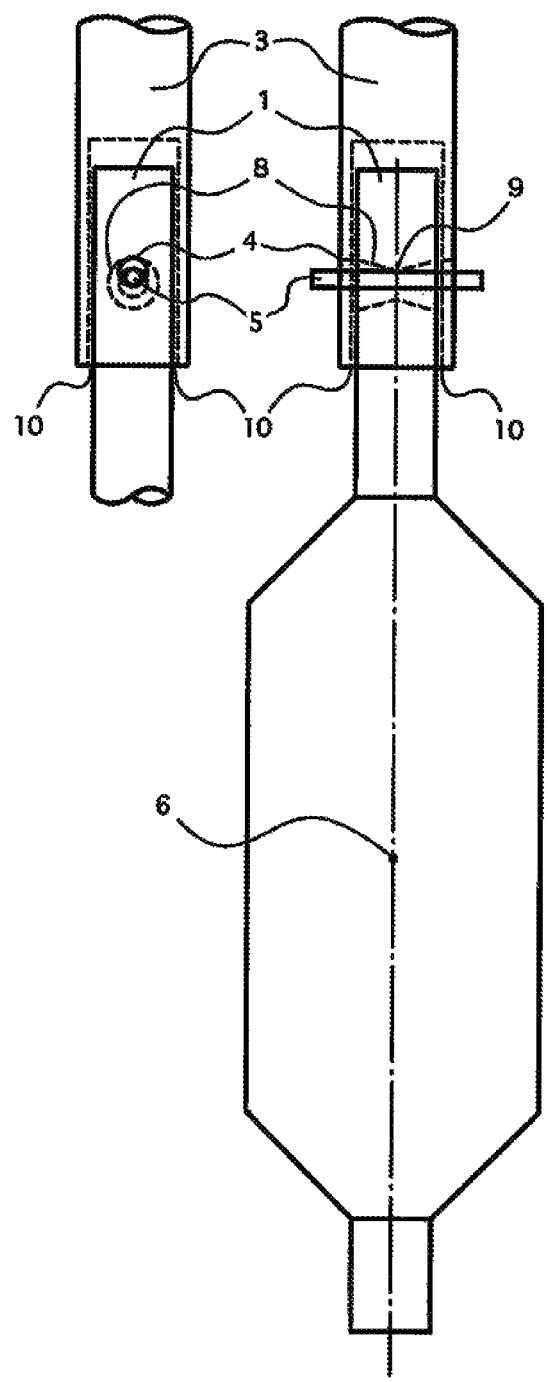
FIG. 6 is a schematic vertical cross-sectional view of a conventional glass base material hanging mechanism.

FIG. 4 shows an exemplary hanging pin according to the present embodiment. The hanging pin 5 may be a simple cylindrical pillar, but is preferably a cylindrical pillar from which a portion of the side surface is removed to form the flat surface 16, as shown in FIG. 4.

The hanging component 1 is inserted into the vertical hole of the hanging shaft tube 3, and the hanging pin 5 is inserted into the horizontal hole 11 of the hanging component 1 and the horizontal hole 4 of the hanging shaft tube 3, thereby connecting the hanging component 1 and the hanging shaft tube 3. An expandable graphite sheet or the like may be sandwiched between the contact surfaces of the hanging pin 5 and the horizontal hole 11 of the hanging component 1, to serve as the shock absorbent material.

In the manner described above, by hanging the hanging component 1 in the hanging shaft tube 3, the center of mass 6 of the glass base material is directly below the hanging pin 5, and therefore the glass base material does not tilt. Furthermore, due to the effect of the flat surface 12 provided on the top surface of the horizontal hole of the hanging component 1 at an inclined angle of 30 degrees relative to the horizontal plane, the hanging component 1 is tightly in contact with the inner surface of the hanging shaft tube 3 (the left side surface in FIG. 1), thereby tightly connecting the hanging component 1 and the hanging shaft tube 3.

By using the glass base material hanging mechanism of the present embodiment, the hanging shaft tube and the hanging component can be connected to each other both tightly and vertically. As a result, the eccentricity during the deposition step of the optical fiber glass base material is decreased, the non-circularity, eccentricity, and bending during the sintering process are restricted, the non-circularity and bending during the elongating step are decreased, and the fiber curl, non-circularity, and eccentricity during the drawing step of the optical fiber are restricted.

LIST OF REFERENCE NUMERALS

1: hanging component, 2: wedge-shaped notch, 3: hanging shaft tube, 4: horizontal hole, 5: hanging pin, 6: center of mass, 7: contact point, 8: horizontal hole, 9: support point, 10: gap, 11: horizontal hole, 12: flat surface, 13: flat surface forming member, 14: vertical hole center, 15: outer diameter center, 16: flat surface

What is claimed is:

1. A glass base material hanging mechanism that is used in an optical fiber glass base material manufacturing apparatus or an optical fiber drawing apparatus, the glass base material hanging mechanism comprising:
   a hanging shaft tube that is for hanging a starting member or glass base material and that has a horizontal hole formed in a side portion thereof passing through a central axis thereof; and
   a hanging component that is positioned above the starting member or glass base material and that has a horizontal hole with an inclined flat surface, wherein
   the flat surface is formed in a top surface of the horizontal hole in a manner to be inclined relative to a horizontal plane in a cross-sectional plane orthogonal to a direction in which the horizontal hole extends,
   the hanging component is inserted into the hanging shaft tube,
   both of the horizontal holes are aligned and a hanging pin is inserted through the horizontal holes to connect the hanging shaft tube and the hanging component such that a side surface of the hanging component is in contact with an inner surface of the hanging shaft tube, and
   a vertical hole center of the hanging shaft tube is provided at a position offset from an outer diameter center of the hanging shaft tube.

2. The glass base material hanging mechanism according to claim 1, wherein
   the hanging pin is a cylindrical pillar having a flat surface formed in a portion of a side surface thereof, and
   the flat surface of the hanging pin is connected to and in contact with the flat surface of the horizontal hole of the hanging component.

3. The glass base material hanging mechanism according to claim 1, wherein
   the horizontal hole of the hanging component is formed by inserting into a round hole a flat surface forming member having the inclined flat surface.

4. The glass base material hanging mechanism according to claim 1, wherein
   an angle formed between the horizontal plane and the inclined flat surface in the horizontal hole of the hanging component is no less than 20 degrees and no greater than 60 degrees.

5. A glass base material hanging mechanism that is used in an optical fiber glass base material manufacturing apparatus or an optical fiber drawing apparatus, the glass base material hanging mechanism comprising:
   a hanging shaft tube that is for hanging a starting member or glass base material and that has a horizontal hole formed in a side portion thereof passing through a central axis thereof; and
   a hanging component that is positioned above the starting member or glass base material and that has a horizontal hole with an inclined flat surface, wherein
   the flat surface is formed in a top surface of the horizontal hole in a manner to be inclined relative to a horizontal plane in a cross-sectional plane orthogonal to a direction in which the horizontal hole extends,
   the hanging component is inserted into the hanging shaft tube,
   both of the horizontal holes are aligned and a hanging pin is inserted through the horizontal holes to connect the hanging shaft tube and the hanging component, and
   a vertical hole center of the hanging shaft tube is provided at a position offset from an outer diameter center of the hanging shaft tube.

6. The glass base material hanging mechanism according to claim 5, wherein
   the vertical hole center of the hanging shaft tube is offset from a center of an outer contour of the hanging shaft tube in a direction opposite a lower side of the flat surface of the horizontal hole of the hanging component.

7. The glass base material hanging mechanism according to claim 1, wherein
   the optical fiber glass base material manufacturing apparatus is one of a porous glass base material deposition apparatus, a porous glass base material sintering apparatus, a glass base material elongating apparatus, and an optical fiber drawing apparatus.

8. A glass base material hanging method, comprising:

in an optical fiber glass base material manufacturing apparatus or an optical fiber drawing apparatus, including a hanging shaft tube for hanging a starting member or glass base material, forming a horizontal hole in a side portion of the hanging shaft tube that passes through a central axis, including a hanging component that is positioned above the starting member or glass base material, forming a horizontal hole passing through a center line of the hanging component with an inclined flat surface in the hanging component, and forming the flat surface in a top surface of the horizontal hole in a manner to be inclined relative to a horizontal plane in a cross-sectional plane orthogonal to a direction in which the horizontal hole extends;

inserting the hanging component into the hanging shaft tube; and aligning both horizontal holes and inserting a hanging pin through the horizontal holes to connect the hanging shaft tube and the hanging component such that a side surface of the hanging component is in contact with an inner surface of the hanging shaft tube;

wherein a vertical hole center of the hanging shaft tube is provided at a position offset from an outer diameter center of the hanging shaft tube.

9. The glass base material hanging mechanism according to claim 1, wherein the inclined surface of the horizontal hole of the hanging component spans a center line of the hanging component.

10. The glass base material hanging method according to claim 8, wherein the inclined surface of the horizontal hole of the hanging component is formed to span the center line of the hanging component.

* * * * *